(12) United States Patent
Itou

(10) Patent No.: US 9,150,117 B2
(45) Date of Patent: Oct. 6, 2015

(54) VEHICLE VIBRATION SUPPRESSION CONTROL DEVICE AND VEHICLE VIBRATION SUPPRESSION CONTROL METHOD

(71) Applicant: NISSAN MOTOR CO., LTD., Yokohama-shi, Kanagawa (JP)

(72) Inventor: Ken Itou, Machida (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/394,633

(22) PCT Filed: Mar. 7, 2013

(86) PCT No.: PCT/JP2013/056294
§ 371 (c)(1),
(2) Date: Oct. 15, 2014

(87) PCT Pub. No.: WO2013/157314
PCT Pub. Date: Oct. 24, 2013

(65) Prior Publication Data
US 2015/0127202 A1    May 7, 2015

(30) Foreign Application Priority Data

Apr. 18, 2012 (JP) ................. 2012-094717

(51) Int. Cl.
*B62D 5/00* (2006.01)
*B60L 15/20* (2006.01)
(Continued)

(52) U.S. Cl.
CPC . *B60L 15/20* (2013.01); *H02P 6/10* (2013.01); *H02P 29/0038* (2013.01);
(Continued)

(58) Field of Classification Search
CPC ............. B25J 13/088; B60L 2240/423; B60L 2240/486; B62D 5/0472; G01C 19/56; Y02T 10/7258
USPC .......................................... 701/36
See application file for complete search history.

(56) References Cited

U.S. PATENT DOCUMENTS

| 6,756,758 | B2 | 6/2004 | Karikomi et al. |
| 2003/0029653 | A1* | 2/2003 | Fujikawa ................. 180/65.2 |
| 2013/0124048 | A1* | 5/2013 | Gruener et al. ............... 701/42 |
| 2013/0184918 | A1* | 7/2013 | Motosugi et al. ............. 701/22 |

FOREIGN PATENT DOCUMENTS

| JP | 5-176580 A | 7/1993 |
| JP | 8-168280 A | 6/1996 |

(Continued)

*Primary Examiner* — Helal A Algahaim
*Assistant Examiner* — Paul Castro
(74) *Attorney, Agent, or Firm* — Foley & Lardner LLP

(57) ABSTRACT

A vehicle vibration suppression control device includes: a first torque target value calculation unit that inputs a motor torque instruction value and that uses a previously modeled transmission characteristic of the vehicle to calculate a first torque target value; a second torque target value calculation unit that includes a filter having a characteristic of a model H(s)/Gp(s) formed with a model Gp(s) of a transmission characteristic of a torque input to the vehicle and a motor angular velocity and a bandpass filter H(s) in which a frequency in the vicinity of a torsional vibration frequency in the vehicle is a center frequency, that inputs a deviation between a detection value of the vehicle state amount and an estimation value of the vehicle state amount and that calculates a second torque target value; and a motor torque control unit that controls a motor torque according to a final torque target value obtained by adding the first torque target value and the second torque target value. The vehicle state amount is estimated based on the first torque target value on which the lag processing has been performed and the second torque target value.

8 Claims, 12 Drawing Sheets

(51) Int. Cl.
*H02P 29/00* (2006.01)
*H02P 6/10* (2006.01)

(52) U.S. Cl.
CPC ....... *B60L 2240/12* (2013.01); *B60L 2240/421* (2013.01); *B60L 2240/423* (2013.01); *B60L 2240/80* (2013.01); *B60L 2260/44* (2013.01); *B60L 2270/145* (2013.01); *Y02T 10/642* (2013.01); *Y02T 10/7275* (2013.01)

(56) References Cited

FOREIGN PATENT DOCUMENTS

| | | |
|---|---|---|
| JP | 2002-142480 A | 5/2002 |
| JP | 2003-9566 A | 1/2003 |
| JP | 2005-269835 A | 9/2005 |
| JP | 2006-50750 A | 2/2006 |
| JP | 2010-200567 A | 9/2010 |

* cited by examiner

VEHICLE VIBRATION SUPPRESSION CONTROL DEVICE AND VEHICLE VIBRATION SUPPRESSION CONTROL METHOD

TECHNICAL FIELD

The present invention relates to vehicle vibration suppression control devices and vehicle vibration suppression control methods.

BACKGROUND ART

Conventionally, a vehicle vibration suppression control device is known that includes: a feedforward compensator $Gm(s)/Gp(s)$ consisting of a transmission characteristic $Gp(s)$ which is linearly approximated control target and a model response $Gm(s)$; a motor angular velocity estimation unit that inputs a final torque target value and that uses the transmission characteristic $Gp(s)$ which is the control target to estimate a motor angular velocity; and a feedback torque computation unit that calculates a feedback torque by inputting a deviation between a motor angular velocity estimation value and a motor angular velocity detection value into a filter $H(s)/Gp(s)$ consisting of the inverse characteristic of the transmission characteristic $Gp(s)$ which is the control target and a bandpass filter $H(s)$ (see JP2003-9566A). The feedforward control and feedback control system described above is formed, and thus when there is no lag element in the control system, it is possible to obtain an ideal vehicle response intended by a designer to a torque instruction value and disturbance.

However, in an actual control device, there are a time lag caused by a control computation time, a motor response lag and a time lag caused by a time necessary for the detection and processing of signals with various sensors. Hence, even in a state where no disturbance is present, a phase difference is produced between a motor angular velocity estimation value and a motor angular velocity detection value, and thus an unnecessary feedback torque is produced, with the result that an actual vehicle behavior does not agree with a model response.

In order to solve this problem, a vehicle vibration suppression control device disclosed in JP2005-269835A uses, instead of a bandpass filter $H(s)$, $Hc(s)$ in which the center frequency and the gain of the bandpass filter $H(s)$ are adjusted, and thereby removes a phase displacement in the feedback torque.

SUMMARY OF INVENTION

However, in the configuration of the vehicle vibration suppression control device disclosed in JP2005-269835A, an overshoot is disadvantageously produced in a response when disturbance is input to make continuous minor vibrations.

An object of the present invention is to provide a technology for reducing an overshoot and vibration in a response to disturbance while making a response to a torque instruction value agree with a model response.

A vehicle vibration suppression control device according to one embodiment includes: a first torque target value calculation unit that inputs the motor torque instruction value and that uses a previously modeled transmission characteristic of the vehicle to calculate a first torque target value; a lag processing unit that performs lag processing corresponding to a lag element included in a control system; a vehicle state amount detection unit that detects a vehicle state amount; a vehicle state amount estimation unit that estimates the vehicle state amount; a second torque target value calculation unit that includes a filter having a characteristic of a model $H(s)/Gp(s)$ formed with a model $Gp(s)$ of a transmission characteristic of a torque input to the vehicle and a motor angular velocity and a bandpass filter $H(s)$ in which a frequency in a vicinity of a torsional vibration frequency in the vehicle is a center frequency, that inputs a deviation between a detection value of the vehicle state amount and an estimation value of the vehicle state amount and that calculates a second torque target value; and a motor torque control unit that controls a motor torque according to a final torque target value obtained by adding the first torque target value and the second torque target value. The vehicle state amount estimation unit estimates the vehicle state amount based on the first torque target value on which the lag processing has been performed and the second torque target value.

Embodiments of the present invention and advantages of the present invention will be described in detail below with reference to accompanying drawings.

DESCRIPTION OF EMBODIMENTS

First Embodiment

Figure 1:
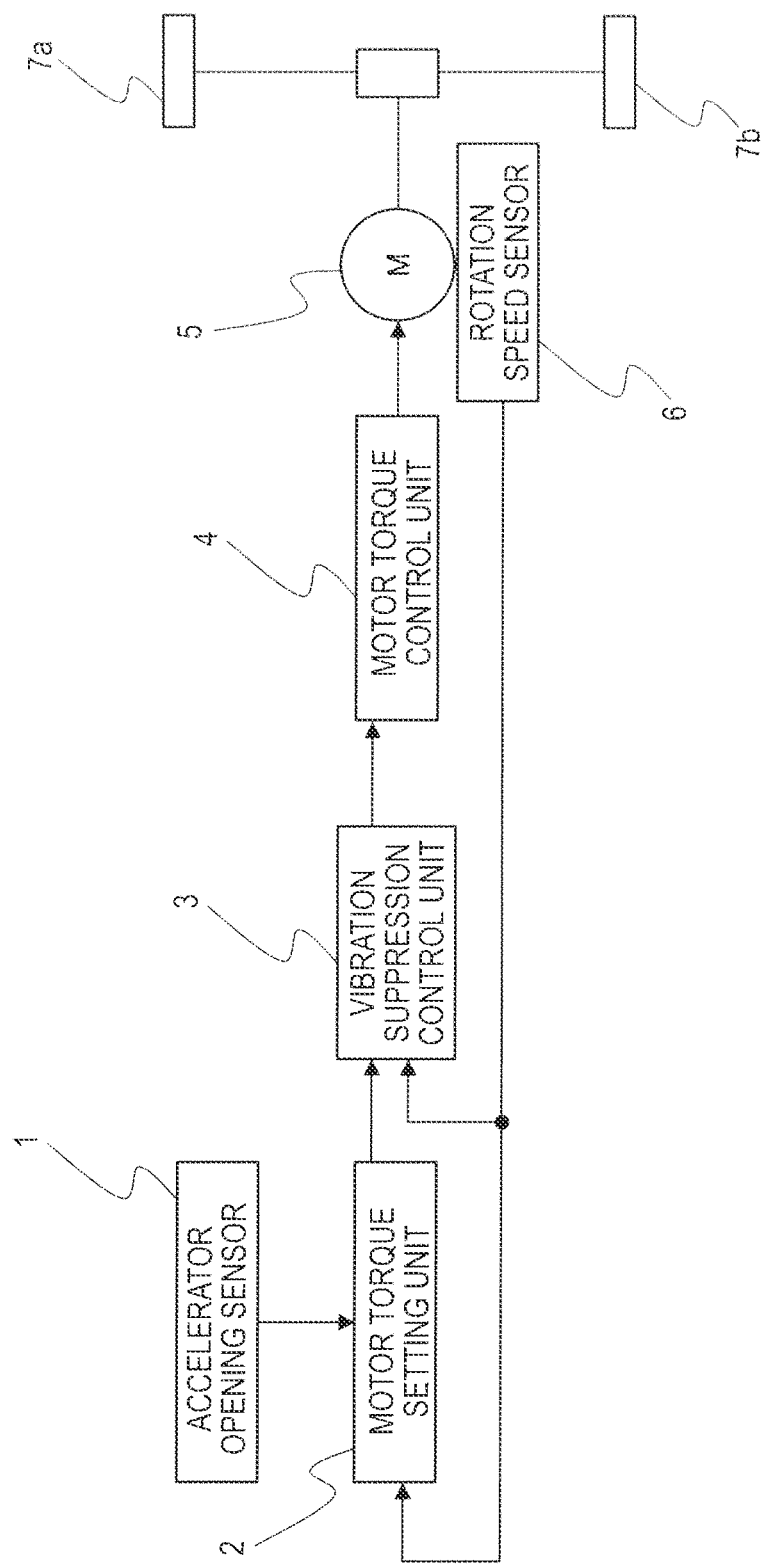
FIG. 1 is a block diagram showing a main configuration of an electric automobile including a vehicle vibration suppression control device according to a first embodiment.

FIG. 1 is a block diagram showing a main configuration of an electric automobile including a vehicle vibration suppression control device according to a first embodiment. The electric automobile refers to an automobile that has an electric motor as a part or the whole of the drive source of a vehicle and that can travel by the drive force of the motor, and the electric automobile includes a hybrid automobile and a fuel-cell automobile. This vehicle is driven by transmitting the rotation force of a three-phase alternating-current motor 5 to wheels 7a and 7b. A rotation speed sensor 6 detects the rotation speed of the motor 5.

An accelerator opening sensor 1 detects an accelerator opening and outputs it to a motor torque setting unit 2. The motor torque setting unit 2 sets a first torque target value Tm1* based on the accelerator opening detected by the accelerator opening sensor 1 and the rotation speed of the motor 5 detected by the rotation speed sensor 6.

A vibration suppression control unit 3 inputs the first torque target value Tm1* set by the motor torque setting unit 2 and the rotation speed of the motor 5 detected by the rotation speed sensor 6, and calculates a motor torque instruction value T*. A method of calculating the motor torque instruction value T* will be described later. A motor torque control unit 4 performs control such that the motor torque instruction value T* calculated by the vibration suppression control unit 3 agrees with an output torque of the three-phase alternating-current motor 5.

Figure 2:
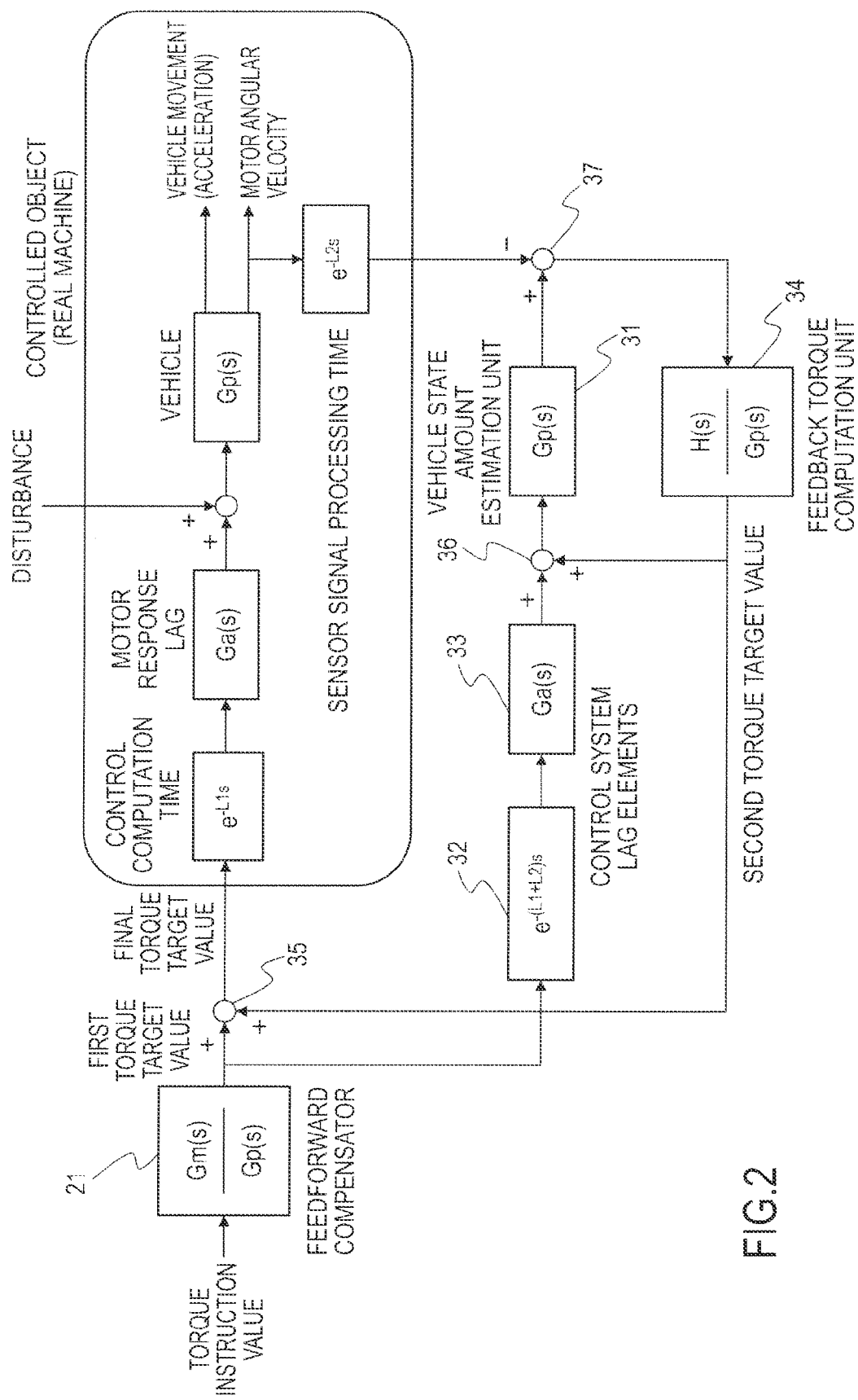
FIG. 2 is a block diagram showing the specific configuration of a motor torque setting unit and a vibration suppression control unit.

FIG. 2 is a block diagram showing the specific configuration of the motor torque setting unit 2 and the vibration suppression control unit 3. The motor torque setting unit 2 includes a control block 21 that is a feedforward compensator and that has a characteristic of Gm(s)/Gp(s). Gp(s) is a model that indicates a transmission characteristic between a torque input to the vehicle and the motor rotation speed, and Gm(s) is a model (ideal model) that indicates a transmission characteristic between the torque input to the vehicle and a response target of the motor rotation speed.

The motor torque setting unit 2 determines a torque instruction value based on the accelerator opening detected by the accelerator opening sensor 1 and the rotation speed of the motor 5 detected by the rotation speed sensor 6. For example, a table that specifies a relationship between the accelerator opening and the motor rotation speed and the torque instruction value is prepared, this table is referenced and thus the torque instruction value is determined. In FIG. 2, a control block for determining the torque instruction value is omitted, and the input of the determined torque instruction value to the control block 21 is only shown.

The control block 21 performs feedforward control for reducing vibration. In other words, the torque instruction value is passed through a filter of Gm(s)/Gp(s), and the first torque target value Tm1* that is highly effective for vibration suppression is determined.

The vibration suppression control unit 3 includes a control block 31 that has a transmission characteristic Gp(s), a time lag controller 32, a motor response lag controller 33, a control block 34 that has a transmission characteristic of H(s)/Gp(s), an adder 35, an adder 36 and a subtracter 37. Among them, the time lag controller 32 and the motor response lag controller 33 constitute a control system lag element.

The adder 35 adds the first torque target value Tm1* output from the control block 21 and a second torque target value Tm2* output from the control block 34, which will be described later, and thereby calculates a final torque target value Tm*.

The time lag controller 32 has a transmission characteristic of $e^{-(L1+L2)s}$, makes the first torque target value Tm1* output from the control block 21 lag only by a predetermined time and outputs it to the motor response lag controller 33. Among the transmission characteristic $e^{-(L1+L2)s}$, $e^{-L1s}$ corresponds to a time necessary for a torsional vibration control computation performed in the present embodiment, that is, a time lag corresponding to a time necessary for calculating the final torque target value after the input of the motor torque instruction value, and $e^{-L2s}$ corresponds to a time necessary for detecting a signal with various types of sensors such as the rotation speed sensor 6 or a time lag corresponding to a time necessary for processing the detected signal value. In other words, the predetermined time includes the time necessary for the torsional vibration control computation performed in the present embodiment, the time necessary for detecting a signal with various types of sensors such as the rotation speed sensor 6 and the time necessary for processing the detected signal value.

The motor response lag controller 33 has a transmission characteristic of Ga(s), and outputs a torque target value with consideration given to the response lag of the motor 5 on the first torque target value Tm1* that is made to lag by the predetermined time. The response lag of the motor 5 is a time until a motor torque is actually produced on the final torque target value.

The adder 36 adds the torque target value output from the motor response lag controller 33 and the second torque target value Tm2* output from the control block 34, and thereby determines the final torque target value.

The control block 31 estimates the angular velocity of the motor 5 based on the final torque target value output from the adder 36.

The subtracter 37 calculates a deviation between the angular velocity of the motor 5 estimated by the control block 31 and the actual angular velocity of the motor 5.

The control block 34 has a transmission characteristic of a filter H(s)/Gp(s) consisting of the inverse characteristic of the transmission characteristic Gp(s) of the vehicle and a bandpass filter H(s), and calculates, based on an angular velocity deviation output from the subtracter 37, the second torque target value Tm2*, which is a feedback component of the vibration suppression control. Here, H(s) has the characteristic of the bandpass filter in which a center frequency agrees with a torsional resonance frequency in the drive system of the vehicle.

Figure 3:
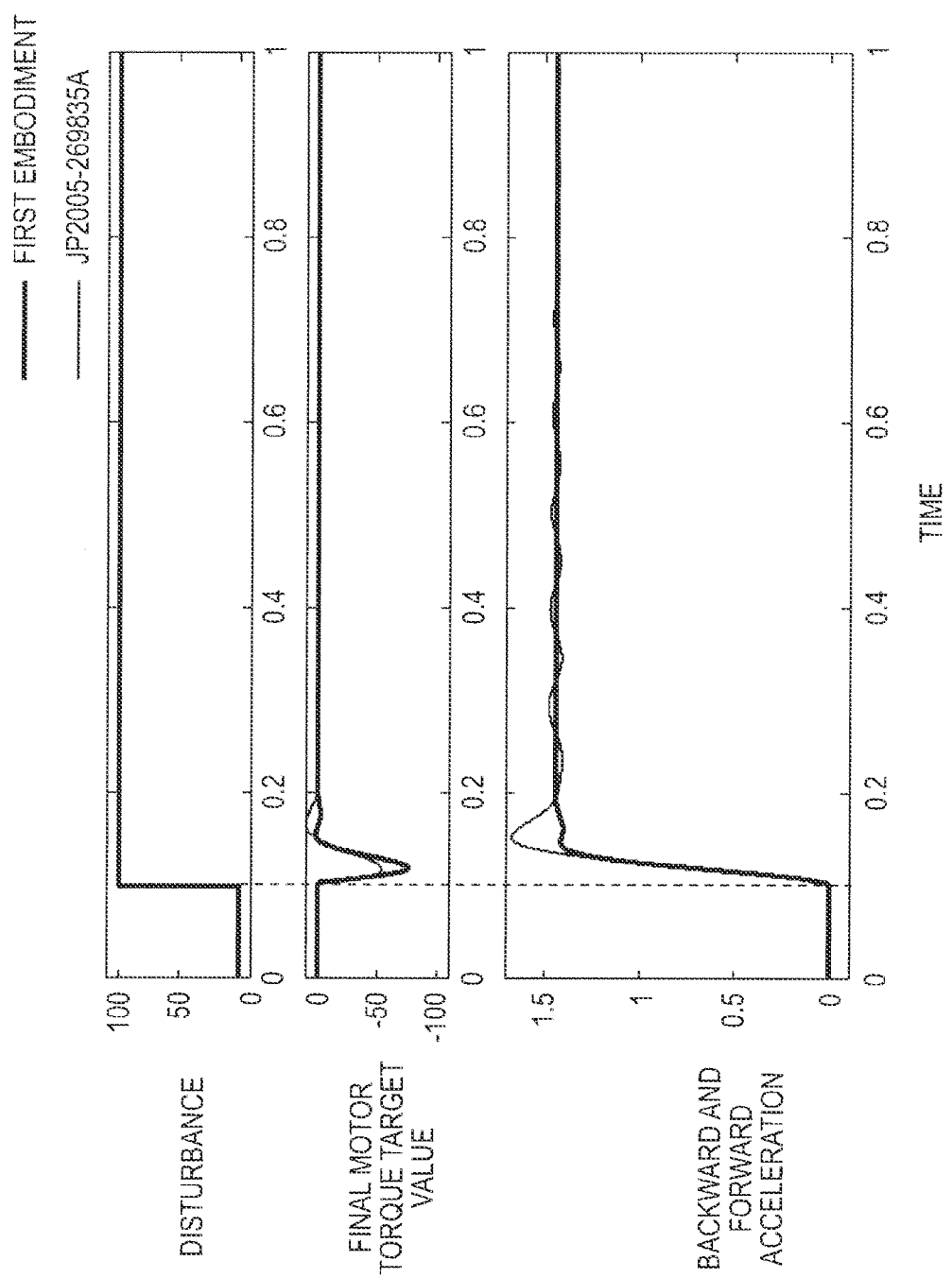
FIG. 3 is a comparison diagram of the results of the control of the vehicle vibration suppression control device in the present embodiment and a vehicle vibration suppression control device disclosed in JP2005-269835A.

FIG. 3 is a comparison diagram of the results of the control of the vehicle vibration suppression control device in the present embodiment and a vehicle vibration suppression control device disclosed to JP2005-269835A. The figure shows, sequentially from above, a change in disturbance with time, a change in the final torque target value Tm* with time and a change in backward and forward acceleration with time.

As shown in FIG. 3, when disturbance is added, in the control performed by the vehicle vibration suppression control device disclosed in JP2005-269835A, an overshoot is produced in the backward and forward acceleration, and thereafter minor vibrations are followed. On the other hand, in the control performed by the vehicle vibration suppression control device of the present embodiment, no overshoot is produced in the backward and forward acceleration, and vibrations quickly disappear.

Figure 4:
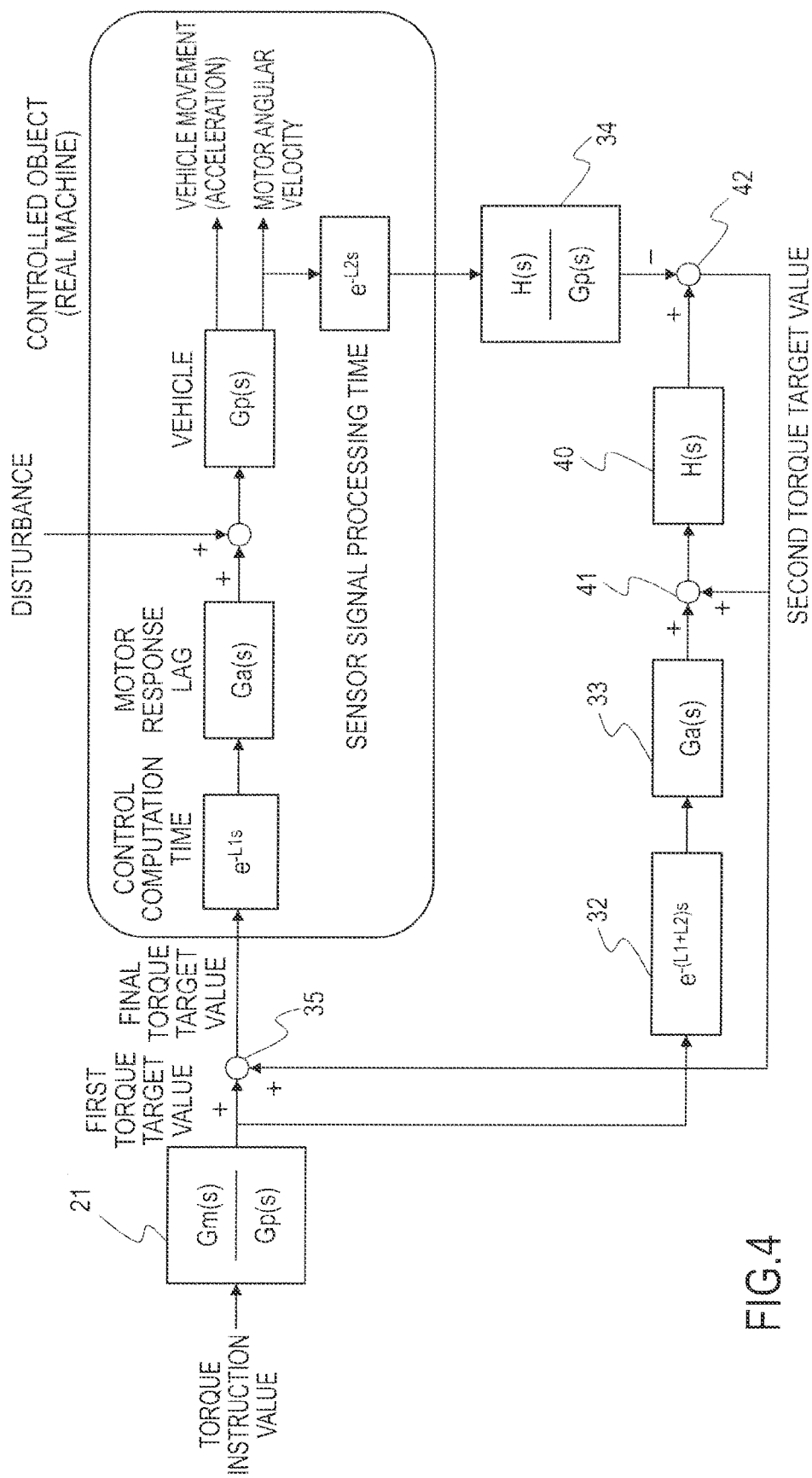
FIG. 4 is a block diagram of a circuit configuration equivalent to the block diagram shown in FIG. 2.

FIG. 4 is a block diagram of a circuit configuration equivalent to the block diagram shown in FIG. 2. The same constituent elements as those in the block diagram shown in FIG. 2 are identified with the same symbols, and their detailed description will be omitted. In the configuration shown in FIG. 4, the vibration suppression control unit 3 includes the time lag controller 32, the motor response lag controller 33, the control block 34 having a transmission characteristic of H(s)/Gp(s), the adder 35, a control block 40 having a transmission characteristic of H(s), an adder 41 and a subtracter 42.

When a motor torque is an input, and a motor angular velocity is an output, Gp(s) is a characteristic having a net integration. In this case, when the embodiment is achieved as a program for a vehicle-mounted controller, there is a concern about a drift caused by a computation error. However, in the configuration shown in FIG. 4, since the control block having the transmission characteristic Gp(s) is omitted, and no net integral term is present, it is possible to prevent a drift from being produced.

Figure 5:
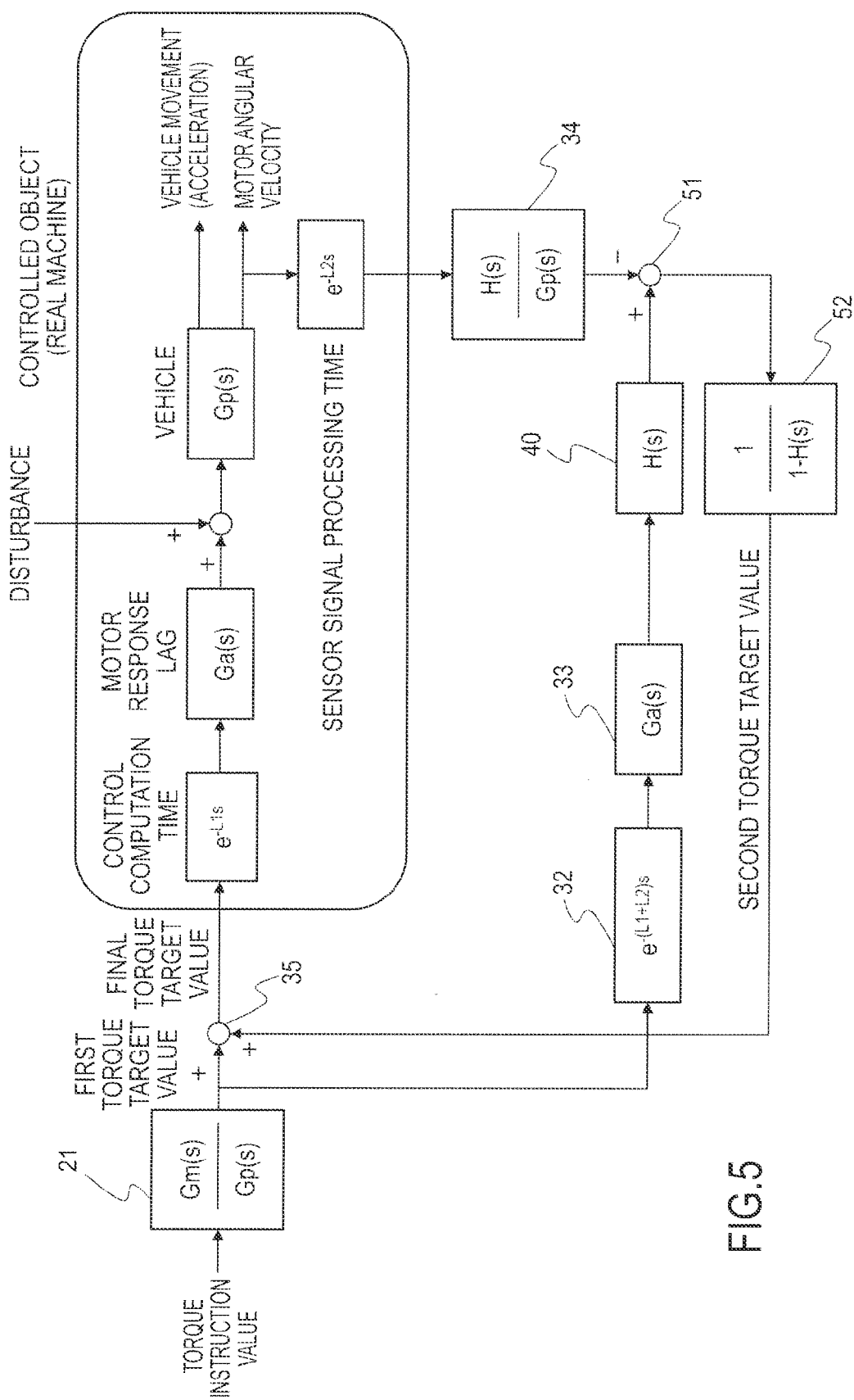
FIG. 5 is a block diagram of a circuit configuration equivalent to the block diagrams shown in FIGS. 2 and 4.

FIG. 5 is a block diagram of a circuit configuration equivalent to the block diagrams shown in FIGS. 2 and 4. The same constituent elements as those in the block diagrams shown in FIGS. 2 and 4 are identified with the same symbols, and their detailed description will be omitted. In the configuration shown in FIG. 5, the vibration suppression control unit 3 includes the time lag controller 32, the motor response lag controller 33, the control block 34 having a transmission characteristic of H(s)/Gp(s), the adder 35, the control block 40 having a transmission characteristic of H(s), a subtracter 51 and a control block 52 having a transmission characteristic of 1/(1−H(s)).

In the circuit configuration shown in FIG. 4, when each transmission characteristic block is discretized by approximation, an algebraic loop is inevitably produced. However, in the circuit configuration shown in FIG. 5, no algebraic loop is produced.

Figure 6:
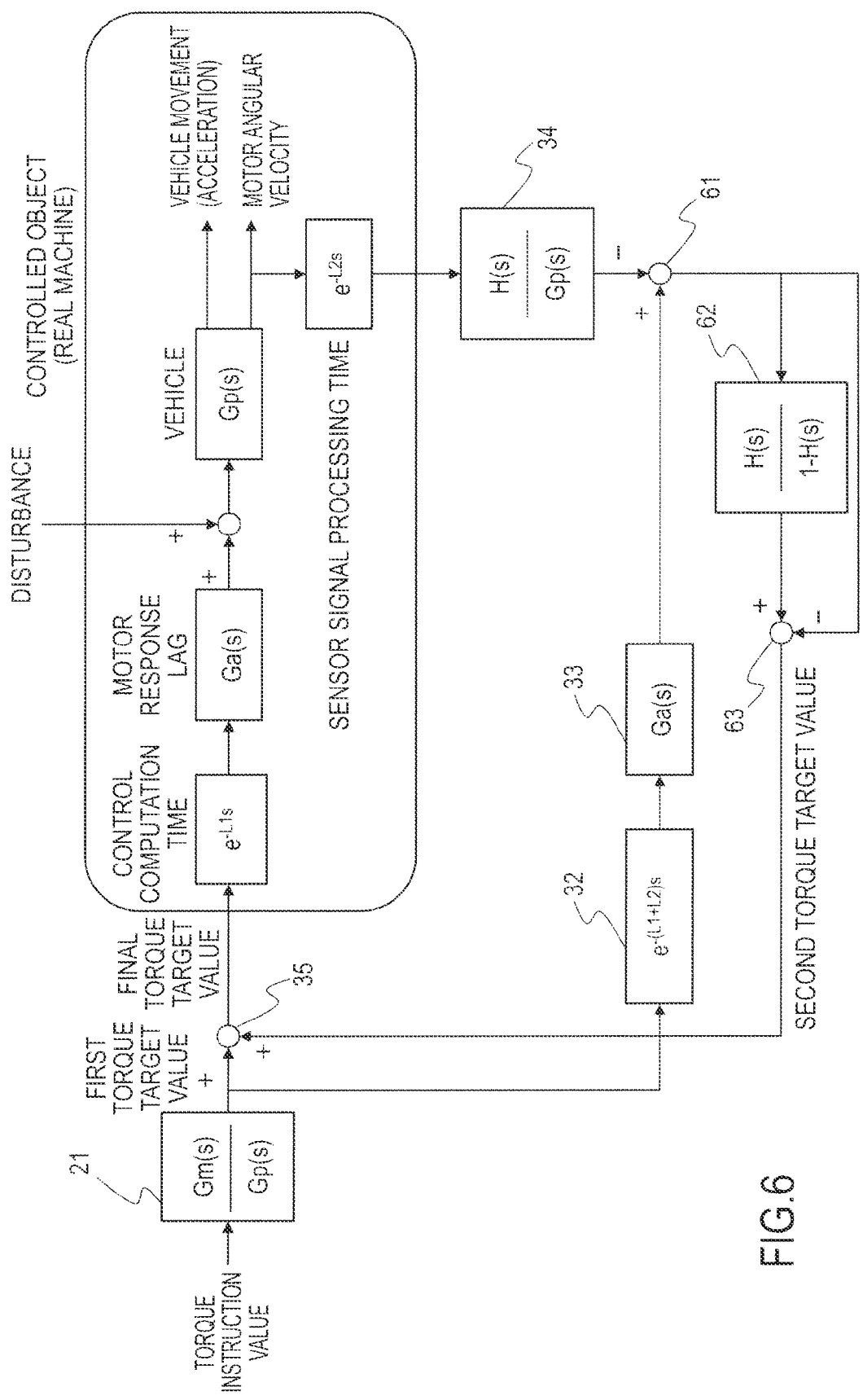
FIG. 6 is a block diagram of a circuit configuration equivalent to the block diagrams shown in FIGS. 2, 4 and 5.

FIG. 6 is a block diagram of a circuit configuration equivalent to the block diagrams shown in FIGS. 2, 4 and 5. The same constituent elements as those in the block diagrams shown in FIGS. 2, 4 and 5 are identified with the same symbols, and their detailed description will be omitted. In the configuration shown in FIG. 6, the vibration suppression control unit 3 includes the time lag controller 32, the motor response lag controller 33, the control block 34 having a transmission characteristic of H(s)/Gp(s), the adder 35, a subtracter 61, a control block 62 having a transmission characteristic of H(s)/(1−H(s)) and a subtracter 63. In the circuit configuration shown in FIG. 6, as compared with the circuit configuration shown in FIG. 5, it is possible to reduce a computation load.

As described above, the vehicle vibration suppression control device of the first embodiment is a vehicle vibration suppression control device that has the function of setting the motor torque instruction value based on vehicle information and controlling the torque of the motor connected to the drive wheels, and includes: the control block 21 (first torque target value calculation unit) that inputs the motor torque instruction value and that uses the previously modeled transmission characteristics of the vehicle and thereby calculates the first torque target value; the time lag controller 32 and the motor response lag controller 33 (lad processing unit) that performs lag processing corresponding to lag elements included in the control system; the rotation speed sensor 6 (vehicle state amount detection unit) that detects a vehicle state amount; the control block 31 (vehicle state amount estimation unit) that estimates the vehicle state amount; the control block 34 (second torque target value calculation unit) that has the filter which has a characteristic of the model H(s)/Gp(s) formed with the model Gp(s) of the transmission characteristic of the torque input to the vehicle and the motor angular velocity and the bandpass filter H(s) in which a frequency in the vicinity of the torsional vibration frequency in the vehicle is the center frequency, that inputs the deviation between the detection value of the vehicle state amount and the estimation value of the vehicle state amount and that calculates the second torque target value; and the motor torque control unit 4 (motor torque control unit) that controls the motor torque according to the final torque target value obtained by adding the first torque target value and the second torque target value. The control block 31 (vehicle state estimation unit) estimates the vehicle state amount (motor angular velocity) based on the first torque target value on which the lag processing has been performed and the second torque target value. For the first torque target value, with consideration given to the lag elements in the control system (the time lag controller 32 and the motor response lag controller 33), the vehicle state amount (motor angular velocity) is estimated, and thus a phase difference between the estimation value and the detection value is eliminated; and for the second torque target value, without consideration given to the lag elements in the control system, the vehicle state amount (motor angular velocity) is estimated, and thus it is possible to prevent the occurrence of an overshoot in the backward and forward acceleration and vibrations for the input of disturbance while making the torque instruction value agree with the model response (see FIG. 3).

The lag elements in the control system includes at least one time lag among a time lag caused by detecting the vehicle state amount and performing predetermined processing, a time lag necessary for processing in the vehicle vibration suppression control device and a time lag until the motor torque is actually produced for the final torque target value. In this way, with consideration given to the actual lag elements included in the control system, it is possible to perform vibration suppression control more accurately.

The motor torque instruction value is input to a linear filter having a characteristic of the model Gm(s)/Gp(s) formed with the ideal model Gm(s) of the transmission characteristic of the torque input and the motor angular velocity and the model Gp(s), and thus the first torque target value is calculated, with the result that it is possible to calculate the torque target value that is highly effective for vibration suppression.

Second Embodiment

Figure 7:
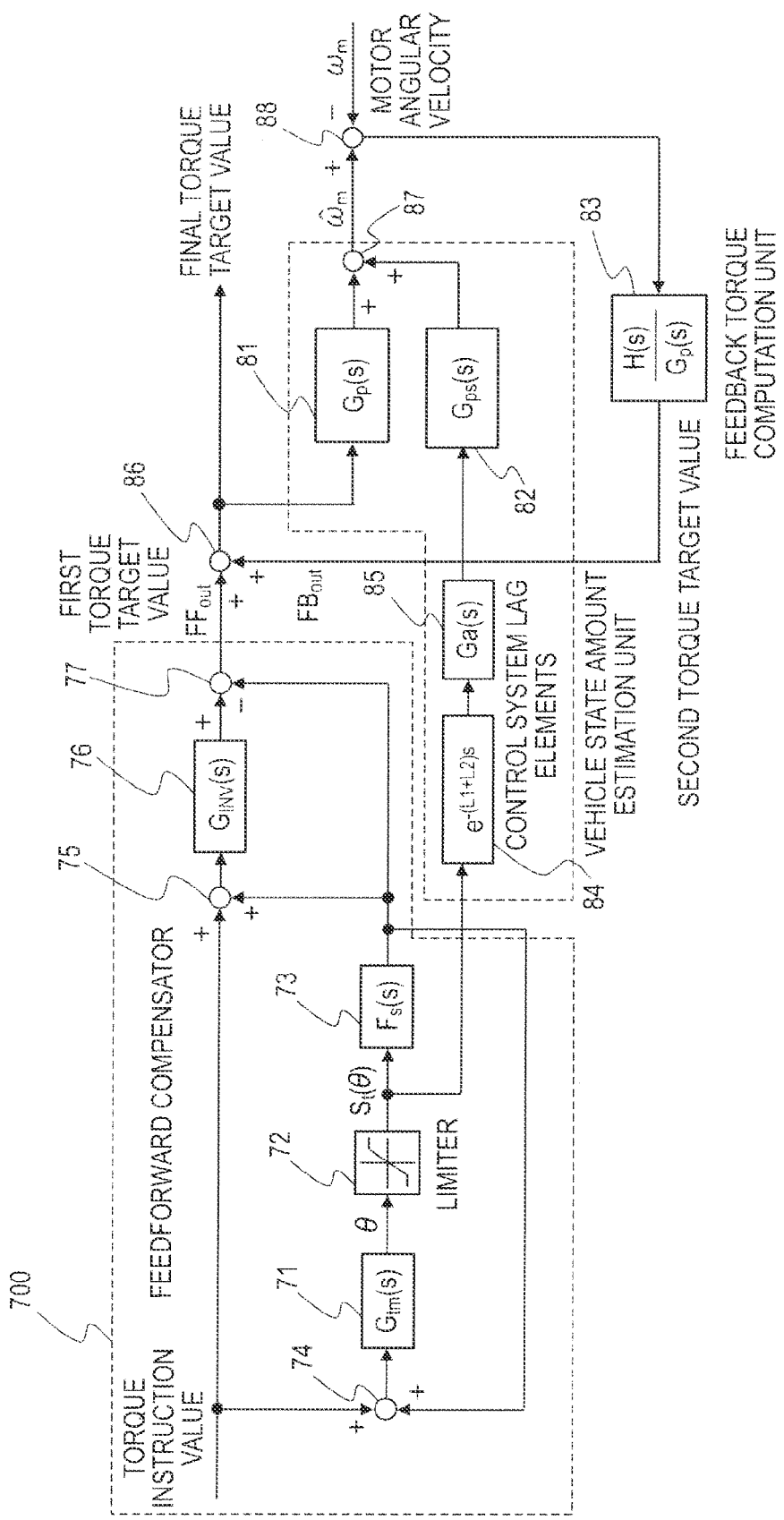
FIG. 7 is a block diagram showing the specific configuration of a motor torque setting unit and a vibration suppression control unit in a vehicle vibration suppression control device according to a second embodiment.

FIG. 7 is a block diagram showing the specific configuration of the motor torque setting unit 2 and the vibration suppression control unit 3 in a vehicle vibration suppression control device according to a second embodiment. In the vehicle vibration suppression control device of the second embodiment, a shock caused by a backlash between the motor and the wheels is reduced.

Figure 8:
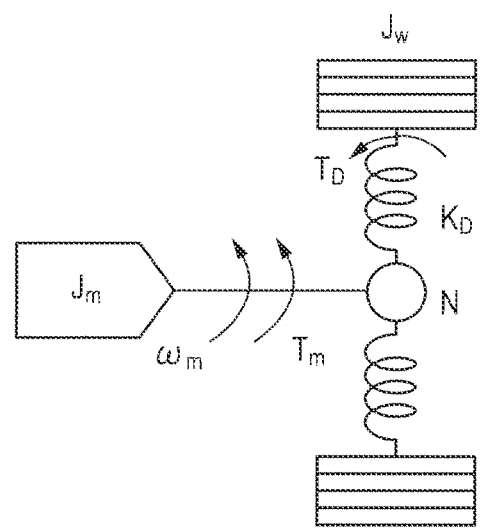
FIG. 8 is a diagram in which the drive force transmission system of the vehicle is modeled.
Figure 8:
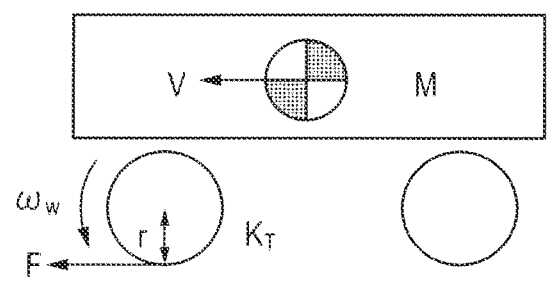

FIG. 8 is a diagram in which the drive force transmission system of the vehicle is modeled. When a dead zone by a backlash is expressed by a difference between a linear function and a saturation function, the motion equation of the vehicle is expressed by formulas (1) to (6) below.

[Formula 1]

$$J_m \cdot \dot{\omega}_m = T_m - T_d / N_{al} \quad (1)$$

[Formula 2]

$$2J_w \cdot \dot{\omega}_w = T_d - rF \quad (2)$$

[Formula 3]

$$M \cdot \dot{V} = F \quad (3)$$

[Formula 4]

$$T_d = K_d \cdot \theta - K_d \cdot St(\theta) \quad (4)$$

[Formula 5]

$$F = K_t \cdot (r\omega_m - V) \quad (5)$$

-continued

[Formula 6]

$$\theta = \int \left(\frac{\omega_m}{N_{al}} - \omega_w\right) dt \quad (6)$$

Here, the parameters are as follows.
Jm: motor inertia
Jw: drive wheel inertia (for one shaft)
Kd: torsional stiffness of a drive shaft
Kt: coefficient on friction between a tire and a road surface
Nal: overall gear ratio
r: tire load radius
ωm: motor angular velocity
ωw: drive wheel angular velocity
Tm: motor torque
Td: drive wheel torque
F: drive force (for two shafts)
V: vehicle speed
θ: torsional angle of the drive shaft
Here, St(θ) in Formula (4) is a saturation function, and is defined by formula (7) below:

[Formula 7]

$$St(\theta) = \begin{cases} -\theta_{BL}/2 & (\theta < -\theta_{BL}/2) \\ \theta & (|\theta| \le \theta_{BL}/2) \\ \theta_{BL}/2 & (\theta > \theta_{BL}/2) \end{cases} \quad (7)$$

where $\theta_{BL}$ is a gear backlash amount in the overall from the motor to the drive shaft.

From formulas (1) to (6), the transmission characteristic from the torque instruction value to the drive shaft torsional angle can be expressed by formulas (8) to (10).

[Formula 8]

$$\theta = G_t(s)\{T_m + F_s(s) \cdot St(\theta)\} \quad (8)$$

[Formula 9]

$$G_t(s) = \frac{p_1 s + p_0}{a_3 s^3 + a_2 s^2 + a_1 s + a_0} \quad (9)$$

$$= \frac{p_1 s + p_0}{a_3 (s+\alpha)(s^2 + 2\zeta_p \omega_p s + \omega_p^2)}$$

[Formula 10]

$$F_s(s) = \frac{a_1 s + a_0}{p_1 s + p_0} \quad (10)$$

Here, p1, p0, a3, a2, a1 and a0 in formulas (9) and (10) can be expressed by formulas (11) to (16), respectively. ζp is an attenuation coefficient in a drive torque transmission system, and ωp is a natural resonance frequency in the drive torque transmission system.

[Formula 11]

$$p_1 = 2 J_w M / N_{a1} \quad (11)$$

[Formula 12]

$$p_0 = K_t (2J_w + r^2 M)/N_{a1} \quad (12)$$

[Formula 13]

$$a_3 = 2 J_m J_w M \quad (13)$$

[Formula 14]

$$a_2 = K_t J_m (2 J_w + r^2 M) \quad (14)$$

[Formula 15]

$$a_1 = K_d M (J_m + 2 J_w / N_{a1}^2) \quad (15)$$

[Formula 16]

$$a_0 = K_d K_t (J_m + 2 J_w / N_{a1}^2 + r^2 M / N_{a1}^2) \quad (16)$$

Hence, from formulas (4) and (8), the drive shaft torque can be expressed by formula (17) below.

[Formula 17]

$$T_d = K_d G_t(s)\{T_m + F_s(s) \cdot St(\theta)\} - K_d \cdot St(\theta) \quad (17)$$

Here, the model response of the drive shaft torque is defined by formulas (18) and (19) below:

[Formula 18]

$$T_{dm} = K_d G_m(s)\{T_m^* + F_s(s) \cdot St(\theta)\} - K_d \cdot St(\theta) \quad (18)$$

[Formula 19]

$$G_m(s) = \frac{p_1 s + p_0}{a_3(s+\alpha)(s^2 + 2\zeta_m \omega_m s + \omega_m^2)} \quad (19)$$

where ζm and ωm are an attenuation coefficient, and a natural resonance frequency in the ideal model.

The torque instruction value in which the drive shaft torque Td agrees with the motor torque Tm is determined and formulas (20) and (21) below are obtained.

[Formula 20]

$$T_m = G_{INV}\{T_m^* + F_s(s) \cdot St(\theta)\} - F_s(s) \cdot St(\theta) \quad (20)$$

[Formula 21]

$$G_{INV} = \frac{s^2 + 2\zeta_p \omega_p s + \omega_p^2}{s^2 + 2\zeta_m \omega_m s + \omega_m^2} \quad (21)$$

Hence, by a linear filter $G_{INV}(s)$ that reduces the natural resonance frequency component, of the torque transmission in the vehicle, a filter Gtm(s) that computes the drive shaft torsional angle, a saturation function (limiter) and a filter Fs(s) that compensates for a phase displacement caused by the wheel inertia of the drive shaft torsional angle and a tire frictional force, the configuration of a feedforward compensator 700 is shown in FIG. 7. A description will be given with reference to FIG. 7, and the feedforward compensator 700 includes a control block 71 that has a transmission characteristic of Gm(s), a limiter 72, a control block 73 that has a transmission characteristic of Fs(s), an adder 74, an adder 75, a control block 76 that has a transmission characteristic of $G_{INV}(s)$ ad a subtracter 77.

The adder 74 adds the torque target value Tm* and an output of the control block 73.

The control block 71 inputs the result of the addition by the adder 74 and outputs a torsional angle θ of the drive shaft as a computation result.

When the torsional angle θ of the drive shaft output from the control block 71 exceeds a predetermined upper limit value, the limiter 72 limits it to the predetermined upper limit value whereas when the torsional angle θ of the drive shaft falls below a predetermined lower limit value, the limiter 72 limits it to the predetermined lower limit value.

The control block 73 inputs the drive shaft torsional angle St(θ) after the upper and lower limit values are limited by the limiter 72, and compensates for a phase displacement caused by the wheel inertia of the drive shaft torsional angle and the tire frictional force.

The adder 75 adds the torque target value Tm* and an output of the control block 73.

The control block 76 inputs the result of the addition by the adder 75, and reduces the natural resonance frequency component of the torque transmission in the vehicle.

The subtracter 77 calculates a deviation $FF_{OUT}$ between the output of the control block 76 and the output of the control block 73, and outputs the calculated deviation $FF_{OUT}$ as the first torque target value.

The vibration suppression control unit 3 includes a control block 81 that has a transmission characteristic Gp(s), a control block 82 that has a transmission characteristic Gps(s), a control block 83 that has a transmission characteristic of H(s)/Gp(s), a time lag controller 84, a motor response lag controller 85, an adder 86, an adder 87 and a subtracter 88. Gps(s) is a transmission function for calculating an amount by which the backlash of the motor rotation speed is compensated for.

The time lag controller 84 makes the drive shaft torsional angle St(θ) after the upper and lower limit values; are limited by the limiter 72 lag only by a predetermined time, and outputs it to the motor response lag controller 85. The predetermined time includes the time necessary for the torsional vibration control computation performed in the present embodiment, the time necessary for detecting a signal with various types of sensors such as the rotation speed sensor 6 and the time necessary for processing the detected signal value.

The motor response lag controller 85 has a transmission characteristic of Ga(s), and outputs a torque target value with consideration given to a time lag until a motor torque is actually produced on the final torque target value.

The control block 82 inputs an output of the motor response lag controller 85, and calculates an amount by which the backlash of the motor angular velocity is compensated for.

The adder 87 adds the amount of the angular velocity of the motor 5 which is estimated by the control block 81 and the amount by which the backlash of the motor angular velocity calculated by the control block 82 is compensated for, and calculates an angular velocity estimation value with consideration given to the backlash.

The subtracter 88 calculates a deviation between the angular velocity estimation value calculated by the adder 87 and the actual angular velocity of the motor 5.

The control block 83 calculates, based on the angular velocity deviation output from the subtracter 88, the second torque target value Tm2*, which is the feedback component of the vibration suppression control.

The time lag controller 84 and the motor response lag controller 85 may be arranged in a stage subsequent to the control block 82.

Here, the transmission functions Gp(s) and Gps(s) will be described.

When the transmission characteristic from the torque instruction value to the motor angular velocity is determined by performing Laplace transform on formulas (1) to (6), formula (22) below is obtained, and Gp(s) and Gps(s) can be expressed by formulas (23) and (24), respectively,

[Formula 22]

$$\omega_m = G_p(s) \cdot T_m + G_{ps}(s) \cdot St(\theta) \tag{22}$$

[Formula 23]

$$G_p(s) = \frac{1}{s} \cdot \frac{b_3 s^3 + b_2 s^2 + b_1 s + b_0}{a_3 s^3 + a_2 s^2 + a_1 s + a_0} \tag{23}$$

[Formula 24]

$$G_p(s) = \frac{c_2 s^2 + c_1 s}{a_3 s^3 + a_2 s^2 + a_1 s + a_0} \tag{24}$$

where the parameters are as stated in formulas (25) to (30) below.

[Formula 25]

$$b_3 = 2J_w M \tag{25}$$

[Formula 26]

$$b_2 = K_t(2J_w + r^2 M) \tag{26}$$

[Formula 27]

$$b_1 = K_d M \tag{27}$$

[Formula 28]

$$b_0 = K_d K_t \tag{28}$$

[Formula 29]

$$c_2 = 2K_d J_w M/N_{a1} \tag{29}$$

[Formula 30]

$$c_1 = K_d K_t (2J_w + r^2 M)/N_{a1} \tag{30}$$

Formula (23) is organized so as to be expressed by formula (31).

[Formula 31]

$$G_p(s) = \frac{1}{s} \cdot \frac{(s+\beta) \cdot (b'_2 s^2 + b'_1 s + b'_0)}{(s+\alpha) \cdot (s^2 + 2\zeta_p \omega_p s + \omega_p^2)} \tag{31}$$

In a general vehicle, when the extreme and the zero point of the transmission function in formula (31) are checked, one extreme and one zero point indicate very close values. This corresponds to the fact that α and β in formula (31) are very close values. Here, $\zeta_p$ is an attenuation coefficient in a drive torsional vibration system, and $\omega_p$ is a natural resonance frequency in the drive torque transmission system. Hence, by performing pole-zero cancellation (making approximations such that α=β) in formula (31), as shown in formula (32), the transmission characteristic Gp(s) of (secondary)/(tertiary) is formed.

[Formula 32]

$$G_p(s) = \frac{1}{s} \cdot \frac{b'_2 s^2 + b'_1 s + b'_0}{s^2 + 2\zeta_p \omega_p s + \omega_p^2} \tag{32}$$

Figure 9:
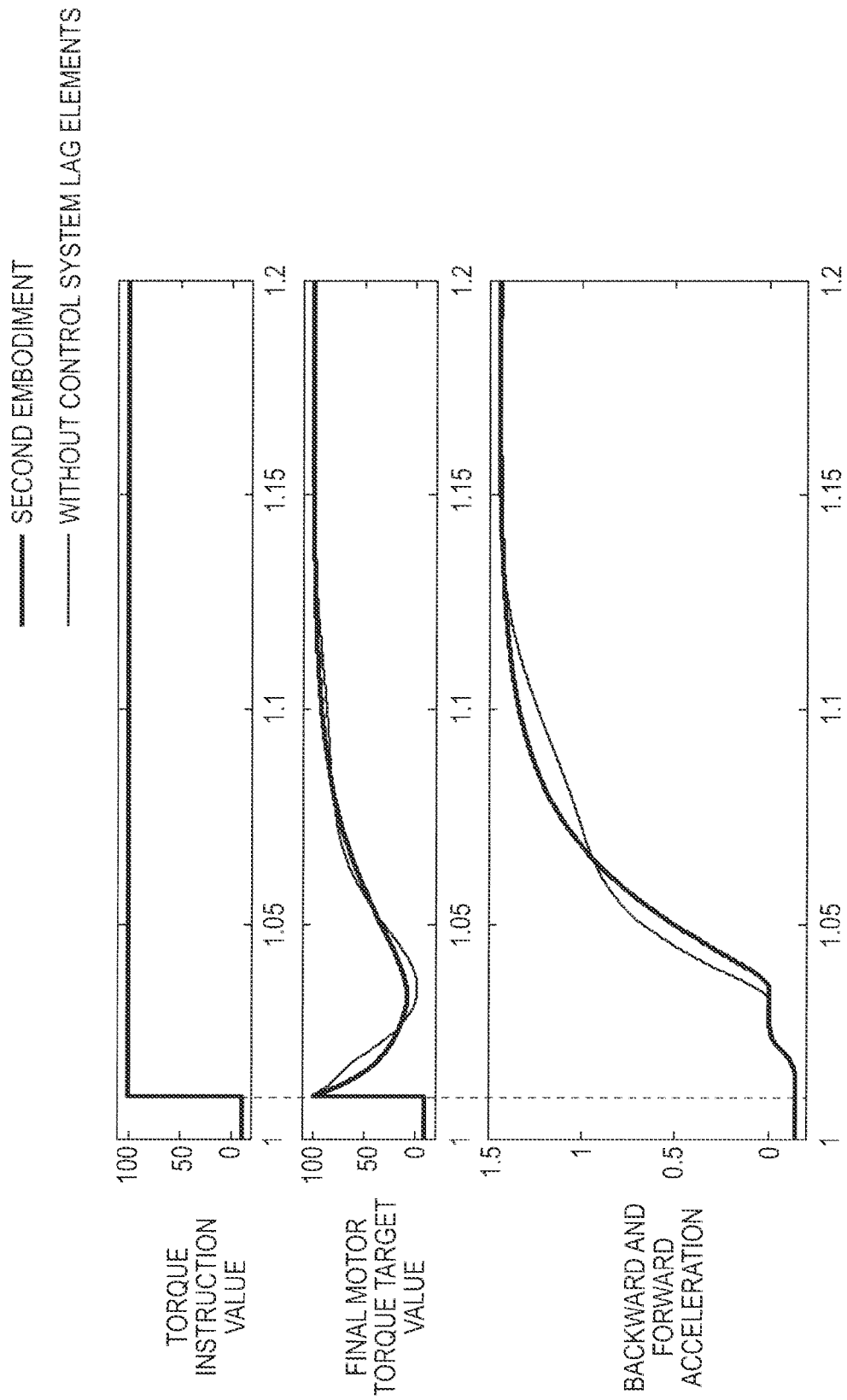
FIG. 9 is a comparison diagram of the results of the control of the vehicle vibration suppression control device in the second embodiment and a configuration in which a time lag controller and a motor response lag controller are not provided.

FIG. 9 is a comparison diagram of the results of the control of the vehicle vibration suppression control device in the second embodiment and a configuration in which the time lag controller 84 and the motor response lag controller 85 are not provided. The figure shows, sequentially from above, a change in disturbance with time, a change in the final torque target value with time and a change in backward and forward acceleration with time. In a case where there is a lag in the control system, when disturbance is input, in the configuration in which the time lag controller 84 and the motor response lag controller 85 are not provided, a displacement from the model response is produced whereas in the control of the present embodiment, it is possible to obtain, a smooth response that substantially agrees with the model response without performing unnecessary feedback compensation.

As described above, in the vehicle vibration suppression control device of the second embodiment, the feedforward compensator 700 (first torque target value calculation unit) includes a filter that reduces, in a vehicle having a mechanical dead zone in the drive torque transmission system, a shock and vibrations caused by the dead zone. In this way, it is possible to reduce a shock caused by a backlash between the motor and the wheels. In the computation of the vehicle state amount estimation value for the first torque target value, consideration is given to the effects of the lag elements in the control system, and thus it is possible to obtain a smooth response that substantially agrees with the model response without performing unnecessary feedback compensation.

Third Embodiment

Figure 10:
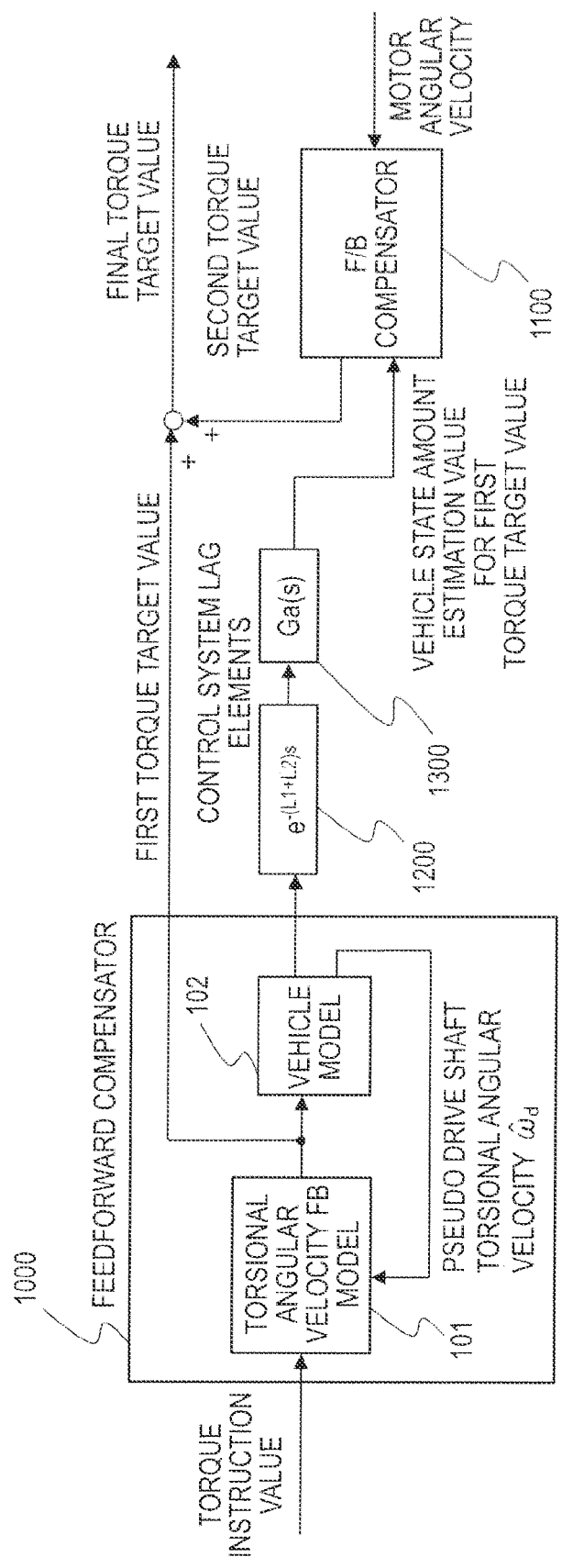
FIG. 10 is a block diagram showing the specific configuration of a motor torque setting unit and a vibration suppression control unit in a vehicle vibration suppression control device according to a third embodiment.

FIG. 10 is a block diagram showing the specific configuration of the motor torque setting unit 2 and the vibration suppression control unit 3 in a vehicle vibration suppression control device according to a third embodiment. Even in the vehicle vibration suppression control device of the third embodiment, an object is to reduce a shock caused by a backlash between the motor and the wheels.

Figure 11:
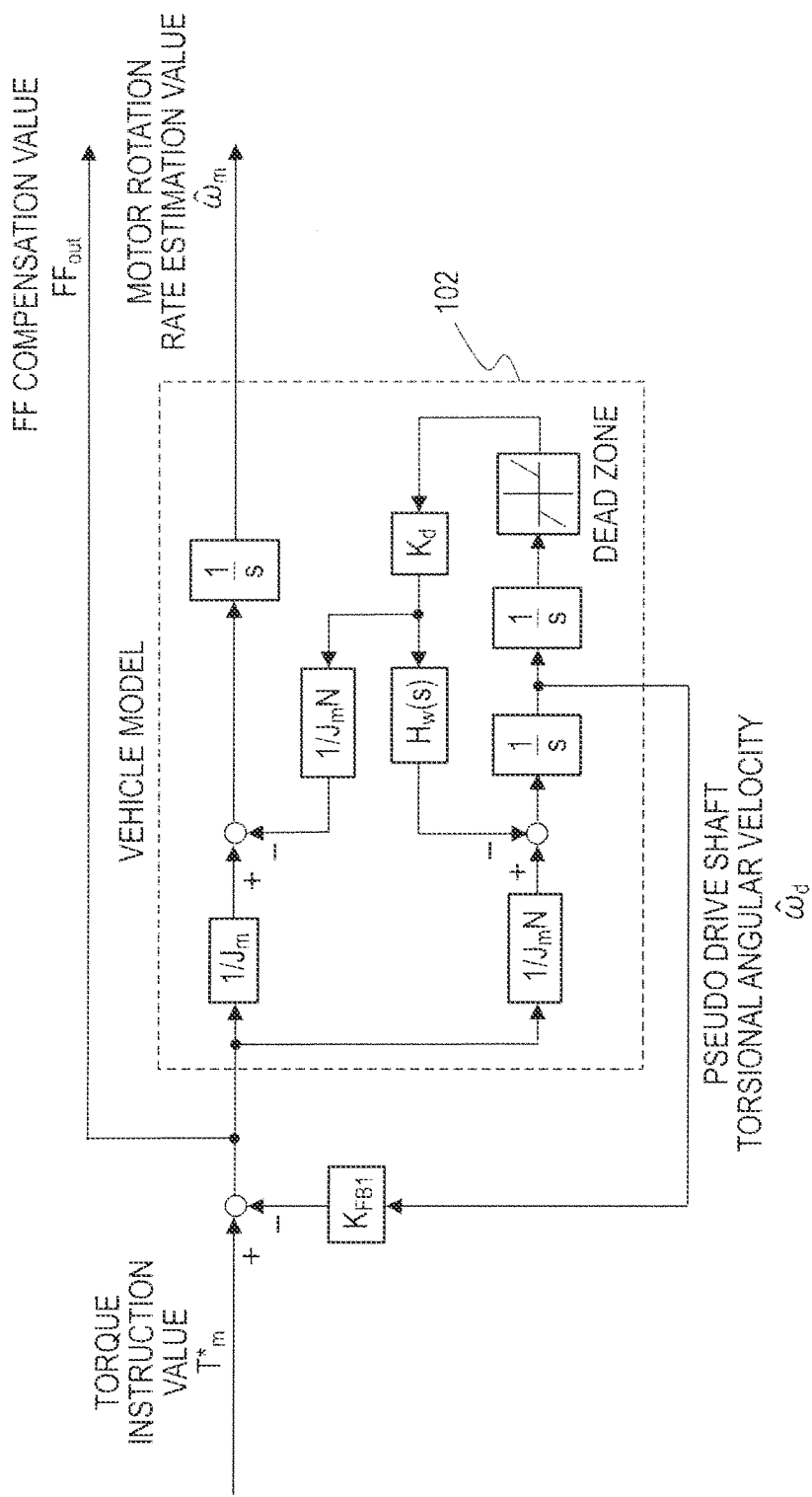
FIG. 11 is a block diagram showing the detailed configuration of a feedforward compensator.

A feedforward compensator 1000 includes a torsional angular velocity feedback model (torsional angular velocity FB model) 101 and a vehicle model 102. FIG. 11 is a block diagram showing the detailed configuration of the feedforward compensator 1000.

The vehicle model 102 will first be described. The motion equation of the vehicle is expressed by formulas (33) to (38) below:

[Formula 33]
$$J_m \cdot \dot{\omega}_m = T_m - T_d / N_{al} \quad (33)$$

[Formula 34]
$$2 J_w \cdot \dot{\omega}_w = T_d - rF \quad (34)$$

[Formula 35]
$$M \cdot \dot{V} = F \quad (35)$$

[Formula 36]
$$T_d = K_d \cdot \theta \quad (36)$$

[Formula 37]
$$F = K_t \cdot (r\omega_m - V) \quad (37)$$

[Formula 38]
$$\theta = \int \left( \frac{\omega_m}{N_{al}} - \omega_w \right) dt \quad (38)$$

where the parameters are as follows.
Jm: motor inertia
Jw: drive wheel inertia
M: mass of a vehicle
Kd: torsional stiffness of a drive shaft
Kt: coefficient on friction between a tire and a road surface
N: overall gear ratio
r: tire load radius
ωm: motor rotation speed
Tm*: motor torque instruction value
Td: drive wheel torque
F: force applied to the vehicle
V: vehicle speed
ωw: drive wheel angular velocity When the transmission characteristic from tire torque instruction value Tm to the motor angular velocity ωm is determined by performing Laplace transform on formulas (33) to (38), they can be expressed by formulas (39) and (40):

[Formula 39]
$$\omega_m = G_p(s) \cdot T_m \quad (39)$$

[Formula 40]
$$G_p(s) = \frac{1}{s} \cdot \frac{b_3 s^3 + b_2 s^2 + b_1 s + b_0}{a_3 s^3 + a_2 s^2 + a_1 s + a_0} \quad (40)$$

where the parameters in formula (40) can be expressed by formulas (41) to (48) below.

[Formula 41]
$$a_3 = 2 J_m J_w M \quad (41)$$

[Formula 42]
$$a_2 = K_t J_m (2 J_w + r^2 M) \quad (42)$$

[Formula 43]
$$a_1 = K_d M (J_m + 2 J_w / N^2) \quad (43)$$

[Formula 44]
$$a_0 = K_d K_t (J_m + 2 J_w / N^2 + r^2 M / N^2) \quad (44)$$

[Formula 45]
$$b_3 = 2 J_w M \quad (45)$$

[Formula 46]
$$b_2 = K_t (2 J_w + r^2 M) \quad (46)$$

[Formula 47]
$$b_1 = K_d M \quad (47)$$

[Formula 48]
$$b_0 = K_d K_t \quad (48)$$

The transmission characteristic from the torque target value Tm to the drive shaft torque Tdm can be expressed by formulas (49) to (51) below.

[Formula 49]

$$\frac{T_d}{T_m} = \frac{c_1 s + c_0}{a_3 s^3 + a_2 s^2 + a_1 s + a_0} \quad (49)$$

[Formula 50]

$$c_1 = 2K_d J_w M / N \quad (50)$$

[Formula 51]

$$c_0 = K_d K_t (2J_w + r^2 M) / N \quad (51)$$

When the transmission characteristic from the motor angular velocity ωm to the drive wheel angular velocity ωw is determined from formulas (34), (36), (37) and (38), it can be expressed by formula (52) below.

[Formula 52]

$$\frac{\omega_w}{\omega_m} = \frac{b_1 s + b_0}{b_3 s^3 + b_2 s^2 + b_1 s + b_0} \cdot \frac{1}{N} \quad (52)$$

From formulas (39), (40) and (52), the transmission characteristic from the torque instruction value Tm to the drive wheel angular velocity ωw can be expressed by formula (53) below.

[Formula 53]

$$\frac{\omega_w}{T_m} = \frac{1}{N} \cdot \frac{1}{s} \cdot \frac{b_1 s + b_0}{a_3 s^3 + a_2 s^2 + a_1 s + a_0} \quad (53)$$

From formulas (49) and (53), the transmission characteristic from the drive shaft torque Td to the drive shaft angular velocity ωw can be expressed by formula (54) below.

[Formula 54]

$$\omega_w = \frac{1}{N} \cdot \frac{1}{s} \cdot \frac{b_1 s + b_0}{c_1 s + c_0} T_d \quad (54)$$

When formula (33) is transformed, it can be expressed by formula (55) below.

[Formula 55]

$$\frac{\omega_m}{N} = \frac{1}{J_m N s} T_m - \frac{1}{J_m N^2 s} T_d \quad (55)$$

Hence, from formulas (54) and (55), a drive shaft torsional angular velocity ωm/N−ωw can be expressed by formula (56) below:

[Formula 56]

$$\frac{\omega_m}{N} - \omega_w = \frac{1}{J_m N s} T_m - \frac{1}{J_m N^2 s} T_d - \frac{1}{N} \cdot \frac{1}{s} \cdot \frac{b_1 s + b_0}{c_1 s + c_0} T_d \quad (56)$$

$$= \frac{1}{s} \cdot \left( \frac{T_m}{J_m N} - H_w(s) \cdot T_d \right)$$

where

[Formula 57]

$$H_w(s) = \frac{v_1 s + v_0}{w_1 s + w_0} \quad (57)$$

[Formula 58]

$$v_1 = J_m N b_1 + c_1 = 2J_w M N (J_m + K_d / N^2) \quad (58)$$

[Formula 59]

$$v_0 = J_m N b_0 + c_0 = K_d K_t (2J_m N^2 + 2J_w + r^2 M) / N \quad (59)$$

[Formula 60]

$$w_1 = J_m N^2 c_1 = 2K_d J_m J_w M N \quad (60)$$

[Formula 61]

$$w_0 = J_m N^2 c_0 = K_d K_t J_m (2J_w + r^2 M) N \quad (61)$$

When a backlash characteristic from the motor to the drive shaft is modeled by the dead zoon, the drive shaft torque Td can be expressed by formula (62) below:

[Formula 62]

$$T_d = \begin{cases} K_d(\theta - \theta_d/2) & (\theta \geq \theta_d/2) \\ 0 & (-\theta_d/2 < \theta < \theta_d/2) \\ K_d(\theta + \theta_d/2) & (\theta \leq -\theta_d/2) \end{cases} \quad (62)$$

where $\theta_d$ is an overall backlash amount from the motor to the drive shaft.

The torsional angular velocity FB model 101 will then be described.

When with a pseudo drive shaft torsional angular velocity ωd=ωm/N−ωw calculated from the vehicle model, a drive shaft torsional angular velocity F/B instruction value $T_{FB}$ is expressed by formula (63) below, it can be expressed by formula (64) from formulas (36) and (38).

[Formula 63]

$$T_{FB} = K_{FB1} \cdot (\omega_m / N - \omega_w) \quad (63)$$

[Formula 64]

$$T_{FB} = \frac{K_{FB1} s}{K_d} \cdot T_d \quad (64)$$

Formula (49) can be transformed into formula (65):

[Formula 65]

$$\frac{T_d}{T_m} = \frac{c_1 s + c_0}{a_3 s^3 + a_2 s^2 + a_1 s + a_0} \qquad (65)$$
$$= \frac{c_1}{a_3} \cdot \frac{s + c_0/c_1}{(s + \alpha)(s^2 + 2\zeta_p \omega_p s + \omega_p^2)}$$

where $\zeta p$ is an attenuation coefficient in a drive torque transmission, system, and $\omega p$ is a natural resonance frequency in the drive torque transmission system.

Furthermore, when the extreme and the zero point in formula (65) are checked, since: $\alpha = c_0/c_1$, pole-zero cancellation is performed to obtain formula (66) below.

[Formula 66]

$$T_d = \frac{g_t}{s^2 + 2\zeta_p \omega_p s + \omega_p^2} T_m \qquad (66)$$
$$g_t = c_0/(a_3 \cdot \alpha)$$

When the drive shaft torsional angular velocity F/B instruction value $T_{FB}$ is subtracted from the torque instruction value $T_m$ by formulas (64) and (66), the drive shaft torque $T_d$ can be expressed by formula (67) below.

[Formula 67]

$$T_d = \frac{g_t}{s^2 + 2\zeta_p \omega_p s + \omega_p^2}(T_m - T_{FB}) \qquad (67)$$
$$= \frac{g_t}{s^2 + 2\zeta_p \omega_p s + \omega_p^2}\left(T_m - \frac{K_{FB1} s}{K_d} \cdot T_d\right)$$

When formula (67) is transformed, the transmission characteristic of the drive shaft torsional angular velocity F/B system can be expressed by formula (68) below.

[Formula 68]

$$T_d = \frac{g_t}{s^2 + (2\zeta_p \omega_p + g_t K_{FB1}/K_d)s + \omega_p^2} T_m \qquad (68)$$

When the model response is assumed to be formula (69) below, conditions under which the transmission characteristic of the drive shaft torsional angular velocity F/B system agrees with the model response are formula (70) below.

[Formula 69]

$$T_d = \frac{g_t}{s^2 + 2\omega_p s + \omega_p^2} T_m \qquad (69)$$

[Formula 70]

$$2\zeta_p \omega_p + g_t K_{FB1}/K_d = 2\omega_p \qquad (70)$$

From formula (70), an F/B gain $K_{FB1}$ can be expressed by formula (71) below.

[Formula 71]

$$K_{FB1} = 2(1-\zeta_p)\omega_p K_d/g_t \qquad (71)$$

Figure 12:
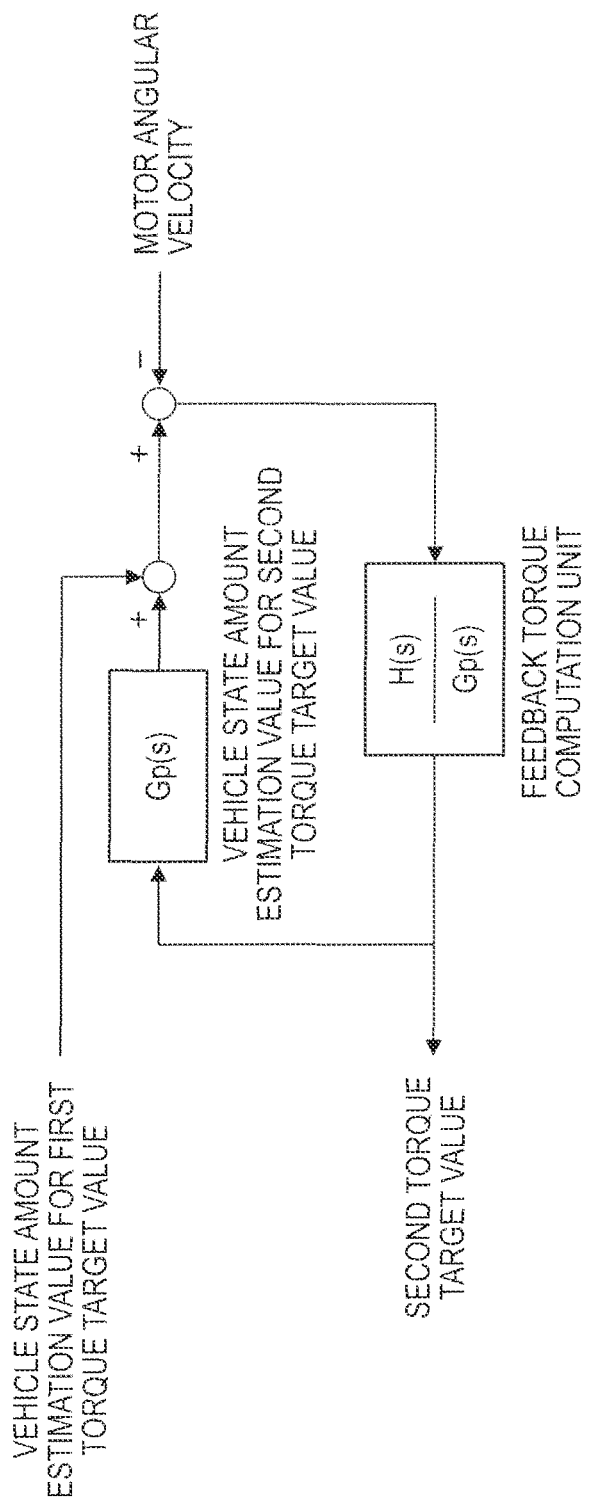
FIG. 12 is a control block diagram of an FB compensator.

FIG. 12 is a control block diagram of an FB compensator 1100. The FB compensator 1100 adds the motor angular velocity estimation value for the first torque target value which is calculated from the vehicle model of the feedforward compensator 1000 and on which the lag processing is performed with a time lag controller 1200 and a motor response lag controller 1300 and the motor angular velocity estimation value for the second torque target value calculated with the transmission characteristic Gp(s) which is the control target by inputting the second torque target value, and thereby calculates the final motor angular velocity estimation value. Then, a deviation between the calculated final motor angular velocity estimation value and the motor angular velocity detection value is passed through a filter H(s)/Gp(s) of the inverse characteristic of the transmission characteristic Gp(s) which is the control target and a bandpass filter H(s), and thus the second torque target value is calculated.

As described above, in the vehicle vibration suppression control device of the third embodiment, the feedforward compensator 1000 (first torque target value calculation unit) includes: the vehicle model 102 in which the motor torque instruction value is used as an input and in which the characteristic from the motor torque to the drive shaft torsional angular velocity is modeled; and the drive shaft torsional angular velocity feedback model 101 that subtracts, from the motor torque instruction value, a value obtained by multiplying the feedback gain by the drive shaft torsional angular velocity determined by the vehicle model 102 so as to calculate the first torque target value. In this way, it is possible to reduce a shock caused by a backlash between the motor and the wheels. In the computation of the vehicle state amount estimation value for the first torque target value, consideration is given to the effects of the lag elements in the control system, and thus it is possible to obtain a smooth response that substantially agrees with the model response without performing unnecessary feedback compensation.

The present invention is not limited to the embodiments described above. For example, although in the first embodiment, FIGS. 4 to 6 show an example of the equivalent transform circuit for mounting the vehicle-mounted controller, it is obvious that even in the second and third embodiments, in order to, for example, avoid a net integration and an algebraic loop at the time of z-transform and reduce a computation load, the same or similar equivalent transform to FIGS. 4 to 6 can be performed.

This application claims priority based on Japanese Patent Application 2012-094717, filed on Apr. 18, 2012 with Japan Patent Office, the entire contents of which are hereby incorporated by reference.

The invention claimed is:

1. A vehicle vibration suppression control device that has a function of setting a motor torque instruction value based on vehicle information and controlling a torque of a motor connected to a drive wheel, the vehicle vibration suppression control device comprising:

a first torque target value calculation unit that is configured to input the motor torque instruction value and use a previously modeled transmission characteristic of the vehicle to calculate a first torque target value;

a lag processing unit that is configured to perform lag processing corresponding to a lag element included in a control system;

a vehicle state amount detection unit that is configured to detect a vehicle state amount;

a vehicle state amount estimation unit that is configured to estimate the vehicle state amount;

a second torque target value calculation unit that is configured to include a filter having a characteristic of a model H(s)/Gp(s) formed with a model Up(s) of a transmission characteristic of a torque input to the vehicle and a motor angular velocity and a bandpass filter H(s) in which a frequency in a vicinity of a torsional vibration frequency in the vehicle is a center frequency, input a deviation between a detection value of the vehicle state amount and an estimation value of the vehicle state amount and calculate a second torque target value; and a motor torque control unit that is configured to control a motor torque according to a final torque target value obtained by adding the first torque target value and the second torque target value, wherein the vehicle state amount estimation unit is configured to estimate the vehicle state amount based on the first torque target value on which the lag processing has been performed and the second torque target value.

2. The vehicle vibration suppression control device according to claim 1, wherein the vehicle state amount is an angular velocity of the motor.

3. The vehicle vibration suppression control device according to claim 1, wherein the lag element included in the control system includes at least one of a time lag caused when the vehicle state amount detection unit detects the vehicle state amount and performs predetermined processing, a time lag necessary for calculating the final torque target value after the input of the motor torque instruction value and a time lag until the motor torque is actually produced for the final torque target value.

4. The vehicle vibration suppression control device according to claim 1, wherein the first torque target value calculation unit is a linear filter having a characteristic of a model Gm(s)/Gp(s) formed with an ideal model Gm(s) of the transmission characteristic of the torque input and the motor angular velocity and the model Gp(s).

5. The vehicle vibration suppression control device according to claim 1, wherein the first torque target value calculation unit includes, in a vehicle having a mechanical dead zone in a drive torque transmission system, a filter for reducing a shock and a vibration caused by the dead zone.

6. The vehicle vibration suppression control device according to claim 1, wherein the first torque target value calculation unit includes: a vehicle model in which the motor torque instruction value is used as an input and in which a characteristic from the motor torque to a drive shaft torsional angular velocity is modeled; and a drive shaft torsional angular velocity feedback model that subtracts, from the motor torque instruction value, a value obtained by multiplying a feedback gain to the drive shaft torsional angular velocity determined by the vehicle model so as to calculate the first torque target value.

7. The vehicle vibration suppression control vice according to claim 5, wherein the vehicle state amount estimation unit is configured to estimate the vehicle state amount based on the first torque target value on which the lag processing has been performed and the second torque target value.

8. A vehicle vibration suppression control method of setting a motor torque instruction value based on vehicle information and controlling a torque of a motor connected to a drive wheel, the vehicle vibration suppression control method comprising steps of:

inputting the motor torque instruction value and using a previously modeled transmission characteristic of the vehicle to calculate a first torque target value;

performing lag processing corresponding to a lag element included in a control system on the first torque target value;

detecting a vehicle state amount;

estimating the vehicle state amount;

including a filter having a characteristic of a model H(s)/Gp(s) formed with a model Gp(s) of a transmission characteristic of a torque input to the vehicle and a motor angular velocity and a bandpass filter H(s) in which a frequency in a vicinity of a torsional vibration frequency in the vehicle is a center frequency, inputting a deviation between a detection value of the vehicle state amount and an estimation value of the vehicle state amount and calculating a second torque target value; and controlling a motor torque according to a final torque target value obtained by adding the first torque target value and the second torque target value, wherein in the step of estimating the vehicle state amount, the vehicle state amount is estimated based on the first torque target value on which the lag processing has been performed and the second torque target value.

* * * * *